Jan. 16, 1962　　H. D. URDANOFF　　3,017,032
FILTER
Filed April 23, 1959　　2 Sheets-Sheet 1

INVENTOR
HOWARD D. URDANOFF
BY Arthur H. Seidel
ATTORNEY

Jan. 16, 1962   H. D. URDANOFF   3,017,032
FILTER
Filed April 23, 1959   2 Sheets-Sheet 2

INVENTOR
HOWARD D. URDANOFF
BY Arthur H. Seidel
ATTORNEY

United States Patent Office 3,017,032
Patented Jan. 16, 1962

3,017,032
FILTER
Howard D. Urdanoff, Levittown, N.Y., assignor to Le Chaude, Inc., Long Island City, N.Y., a corporation of New York
Filed Apr. 23, 1959, Ser. No. 808,431
2 Claims. (Cl. 210—236)

The present invention is directed to a filter, and more particularly to a filter for filtering suspended particles from a liquid such as petroleum products, chemicals, pharmaceuticals, and the like, which filter may be readily cleaned, and whose filter cartridges may be readily replaced.

This invention has as an object the provision of a novel filter.

This invention has an another object the provision of a filter whose filter cartridges may be readily replaced.

This invention has as a yet further object the provision of a filter whose interior may be readily cleaned.

This invention has as yet another object the provision of a filter which can accommodate a wide variety of filter cartridges.

This invention has as yet another object the provision of a filter whose interior is completely accessible at a workable level.

This invention has as a yet further object the provision of a filter whose filter media are completely exposed when the shell is opened.

This invention has as yet another object the provision of a filter whose mounting plate on which the filter cartridges are supported is readily cleanable.

This invention has as another object the provision of a filter whose disassembly may be accomplished readily, and whose shell components may be handled easily.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings, wherein like reference characters refer to like parts:

Figure 1:
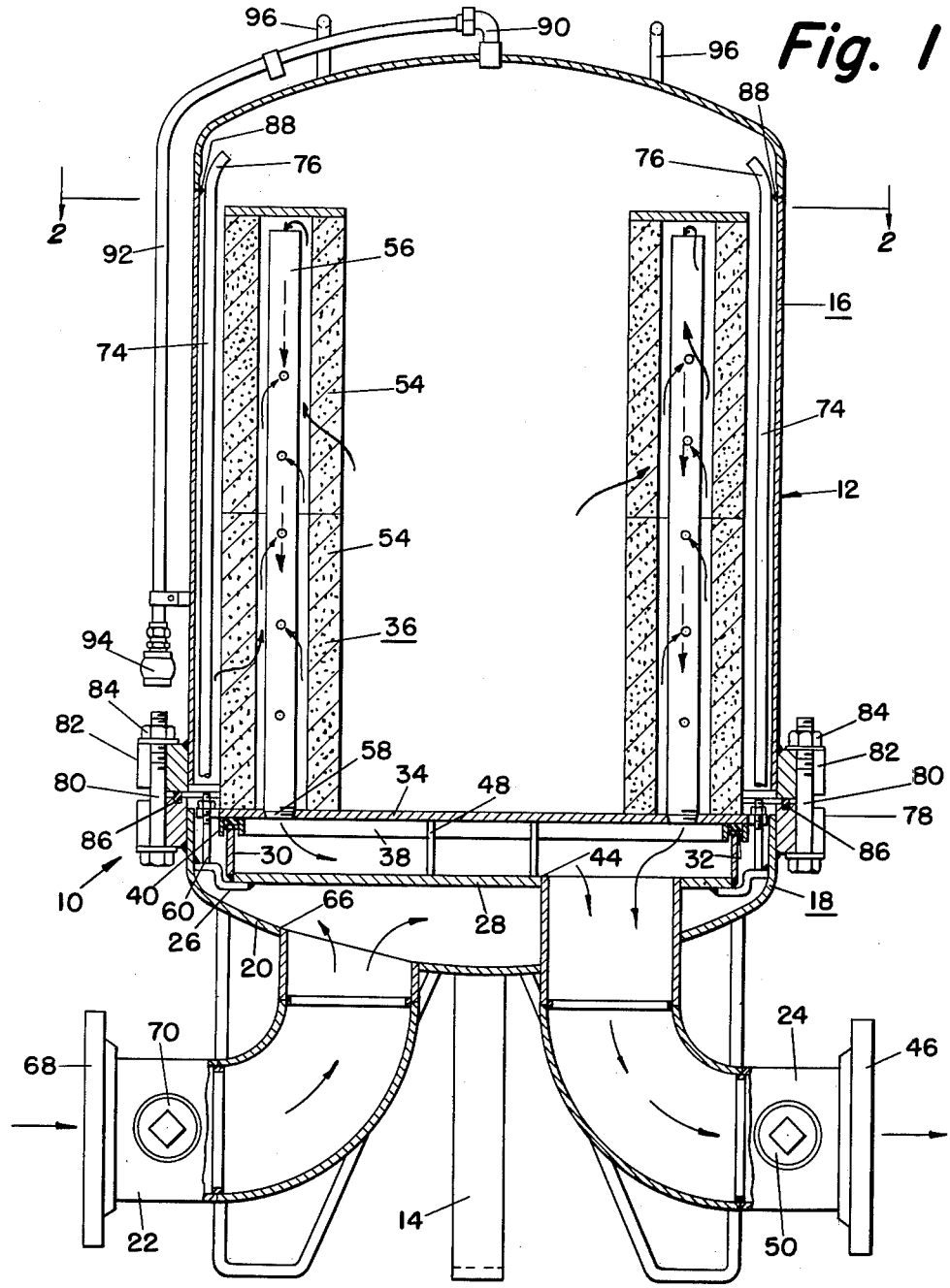
FIGURE 1 is a vertical sectional view taken on line 1—1 of FIGURE 2 of the filter of the present invention.

The filter of the present invention is designated generally as 10, and comprises a shell designated generally as 12, which is supported on a supporting surface by legs 14.

The shell 12 comprises the dome 16 and the base 18. The base 18 is supported on the legs 14 and includes a rounded bottom portion 20. An inlet 22 and an outlet 24 are in communication with the rounded bottom portion 20 as will be explained more fully below.

Mounting flanges 26 having S-vertical sections are fixedly secured, as by welding, to the interior wall surface of the base 18 a short distance above the rounded bottom portion 20. The mounting flanges 26 support the outlet floor plate 28, which is fixedly secured thereto, as by welding or the like. The peripheral edge of the outlet floor plate 28 is provided with an annular riser 30 fixedly secured to the free edge of the outlet floor plate 28, as by welding, or the like. The annular riser 30 provides a liquid-tight seal about the periphery of the outlet floor plate 28.

The annular riser 30 is provided with a cross-head 32 which is fixedly secured to its uppermost edge by welding, or the like.

The mounting plate 34 on which the filter cartridges, designated generally as 36, are carried is supported on the annular riser 30. The mounting plate 34 has secured to its underside about its edge a pair of concentric skirts 38 and 40. The skirts 38 and 40 are spaced from each other a distance somewhat larger than the width of the cross-head 32, so that the cross-head 32 may be received intermediate the skirts 38 and 40. An elastomeric gasket 42 is received intermediate the skirts 38 and 40 and above the cross-head 32.

The outlet floor plate 28 is generally imperforate except for the opening 44 within which the uppermost end of outlet 24 is received. The outlet 24 is an elbow. A coupling flange 46 may be provided at the free end of the outlet 24. It will be seen from FIGURE 1 that the outlet 24 extends through the rounded bottom portion 20 of base 18 and is in communication with the chamber intermediate the outlet floor plate 28 and the mounting plate 34. A spacer 48 may be provided in such chamber to support the mounting plate 34.

Figure 2:
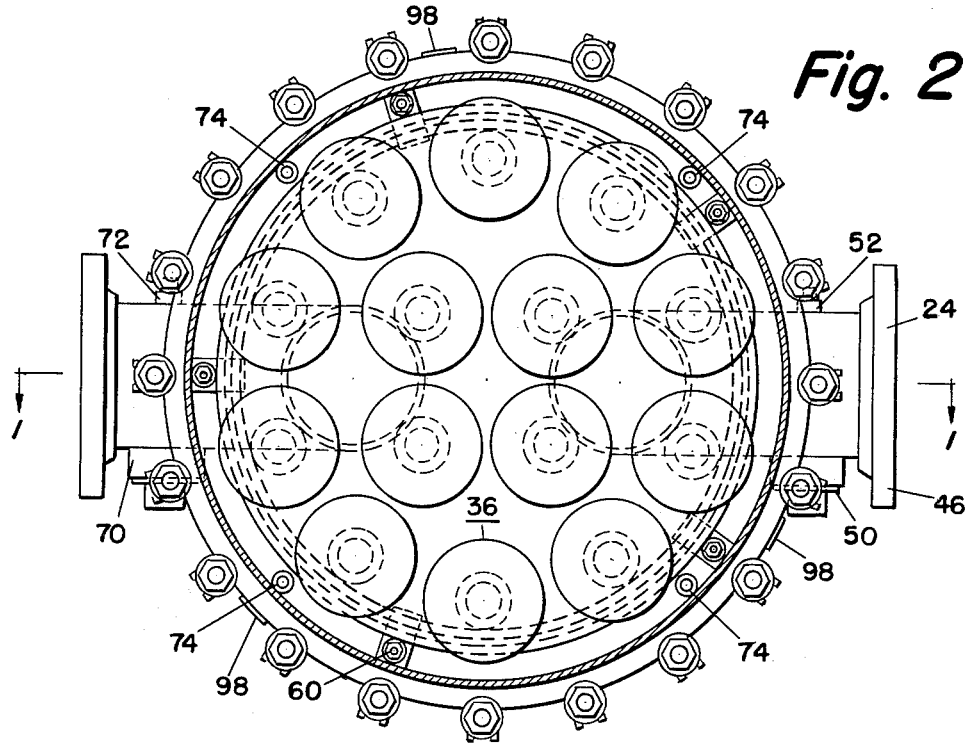
FIGURE 2 is a cross-sectional view taken on line 2—2 of FIGURE 1.

The bottom portion of outlet 24 is threaded to receive the air inlet fitting 52. Such air inlet fitting 52 is shown in FIGURE 2 and serves to permit blowing for cleaning, as will be explained below.

The filter cartridges 36 are each secured to the mounting plate 34. Each of the filter cartridges 36 comprises a replaceable cartridge of conventional construction which includes a pair of axially spaced annular filter mats 54 and 54 spaced from and surrounding the concentric tube 56. For the sake of clarity, part of the filter cartridge construction of each of the filter cartridges 36 is omitted, since as above-indicated, the construction of such cartridges is conventional and forms no part of the present invention. Each of the filter cartridges 36 is held in position on the mounting plate 34 by its tube 56 which is provided with a threaded bottommost end 58 which is threadably received within the mounting plate 34. It is to be emphasized that rapid substitution of the mounting plates 34 may be had with the filter 10 of the present invention, so that the threaded openings in the mounting plate 34 may be matched to any particular size filter cartridge. This permits the filter 10 of the present invention to accommodate to a wide variety of filter cartridges.

The mounting plate 34 is removably secured in reference to the mounting flanges 26 by the threaded studs 60. Five such threaded studs 60 are shown in the drawings, but it is to be understood that a larger or smaller number of such studs 60 may be utilized. The mounting plate 34 is provided with oversize openings 62 through which the threaded studs 60 may be passed. Nuts 64 are carried on the threaded studs 60 and operatively secure the mounting plate 34 in its operative disposition on the cross-head 32 of the annular riser 30.

Figure 3:
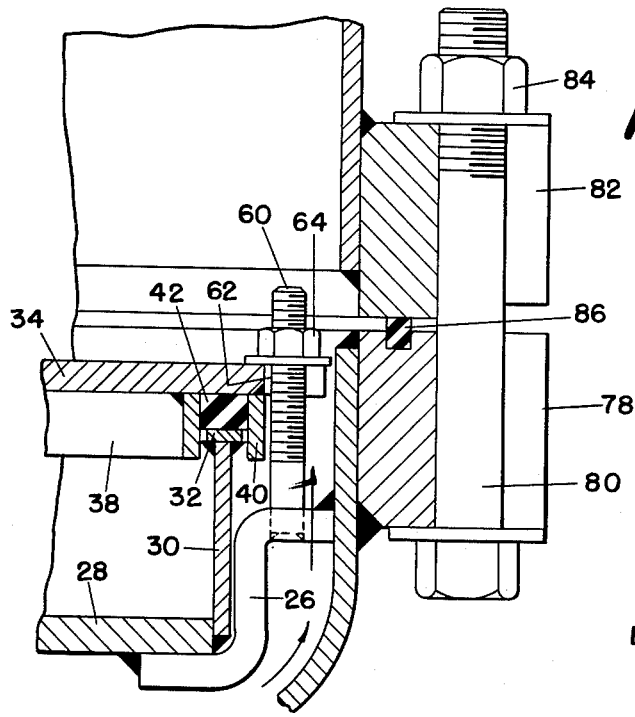
FIGURE 3 is an enlarged fragmentary sectional view taken through one of the holding lugs, and revealing the construction of such holding lug, and the studs which secure the mounting plate in operative disposition.

As seen particularly in FIGURE 3, the peripheral edge of the mounting plate 34 is spaced from the juxtaposed inner wall surface of the base 18. This space permits communication between the inlet 22, which is carried in the opening 66 in the rounded bottom portion 20 of base 18, and the filter mats 54 of the filter cartridges 36. The inlet 22 comprises an elbow, whose coupling flange 68 is in alignment with the coupling flange 46 of the outlet 24. The inlet 22 may be provided with a threaded plug 70, and an air inlet fitting 72.

The mounting plate 34 is provided with a plurality of guide rods 74, four such rods being shown in the illustrated embodiment. Such guide rods 74 extend generally vertically to a height above the height of the filter cartridges 36, and then curve inwardly to provide their bight portions 76.

The base 18 is provided along its peripheral outer wall with a plurality of equidistantly spaced lug members 78. Each such lug member 78 is perforated so as to receive a threaded bolt 80. The dome 16 is provided with a plurality of equidistantly spaced lug members 82 along its bottom margin, each of such lug members 82 mating with a lug member 78 of the base 18. Each of the lug members 82 is perforated and receives threaded bolt 80, such threaded bolt 80 being operatively fixed in position by the nut-and-washer 84. In order to secure a liquid-tight seal between the dome 16 and the base 18, the thickened outer wall of the base 18 on which the lug members 78 are carried is provided with a O-ring receiving groove within which the O-ring 86 is received. The O-ring 86 engages the bottom surface of the thickened outer wall of the dome 16 on which the lug members 82 are carried.

The upper portion of the dome 16 may be provided with an internal guide ring 88 which engages the guide rods 74.

An air vent fitting 90 is provided at the top of the dome 16. An air vent duct 92 comprising the air vent valve 94 is carried on the outermost surface of the dome 16, such air vent duct 92 being in communication with the air vent fitting 90. Handles 96 are provided on the top of the dome 16 for facilitating the raising of the dome 16.

Three dependent support lugs 98 depend from the thickened outer wall of the dome 16 intermediate lug members 82, and permit the dome 16 to be placed on a supporting surface without the bottom surface of the dome 16 touching such supporting surface.

The operation of the filter 10 of the present invention is as follows:

Oil or other liquid to be filtered carrying suspended solids enters the filter 10 through the inlet 22 passing upwardly therethrough and into the bottom portion 20 of base 18 as shown by the arrows in FIGURE 1. From the bottom portion 20 of base 18 such liquid passes about the mounting flanges 26, and through the space intermediate the mounting plate 34 and the juxtaposed inner wall surface of the base 18. Air entrapped within the dome 16 may be removed therefrom through the air vent duct 92, the air vent valve 94 being open until the liquid being filtered fully occupies the dome 16.

The liquid being filtered passes through the filter cartridges 36 within the dome 16 by going from the exterior of the filter mats 54 into the interior of the filter cartridges 36, and then down the tube 56 of each of the filter cartridges 36 into the chamber intermediate mounting plate 34 and the outlet floor plate 28. From such chamber, the filtered liquid passes to the outlet 24 and thence from the filter 10.

In order to clean the filter cartridges 36, the filter cake and filtered materials may be removed therefrom by reverse blowing, as by introducing compressed air through air inlet 52 in outlet 24.

The dome construction of the filter of the present invention permits facile assembly and disassembly of the filter. The dome 16 may be guided into position by the guide rods 74, such guide rods 74 and their bight portions 76 serving as a cage to protect the filter cartridges 36 when the dome 16 is lowered into position. The assembly and disassembly of the filter 10 is readily accomplished.

The construction of the mounting plate 34 and its facile removal from its seat upon the cross-head 32 of the annular riser 30 carried by the outlet floor plate 28 permits facile cleaning of the mounting plate 34, and facile access to the outlet floor plate 28. Moreover, replacement of the mounting plate 34 with mounting plates having different size threaded openings permits a wide variety of filter cartridges to be used in the filter of the present invention.

The tortuous route traveled by the liquid being filtered insures diffusion of such liquid and the equalization of its velocity within the filter 10. This results in uniform flow patterns for the liquid, assuring substantially uniform filtration action through the filter 10 with optimum utilization of all of the filter cartridges 36 thereof.

The bolts 80 which join the dome 16 and base 18 together are completely accessible, so that assembly and disassembly of the filter can be done at a workable level. Similarly, the removal of the mounting plate 34 is facilitated because the same is carried at a workable level.

Because it is necesasry to completely empty the dome 16 of any liquid before opening up the filter 10, contamination of the outlet portion of the filter through seepage of dirty liquid during cleaning is avoided. The air inlet fitting 72 in the inlet 22 may be utilized to blow down all of the liquid within the filter 10 to a drain or to a sludge tank. Furthermore, the arrangement of the inlet and outlet in the filter of the present invention permits draining of liquid therefrom by gravity, if desired.

The alignment of the coupling flange 68 and the coupling flange 46 permits piping serving the filter 10 to be disposed within a single plane, and eliminates the necessity for elbows, fittings, and the like to be used in connection with the filter 10.

The present invention may be embodied in other specific forms without departing from the spirit or essential attributes thereof and, accordingly, reference should be made to the appended claims, rather than to the foregoing specification as indicating the scope of the invention.

I claim:

1. A filter comprising a base, a mounting plate, a shell, fastener means removably securing said shell to said base, said shell cooperating with said plate to form a filter chamber, the periphery of said plate being spaced radially inwardly of said base to define an annular inlet passage to said chamber, fastener means traversing said annular inlet passage at spaced points, said fastener means including elements removably securing the periphery of said plate to said base, said annular inlet passage surrounding said plate, annular dependent skirts secured to said plate radially inwardly of the periphery of said plate, an annular wall supported by said base and received between said skirts, a seal between said plate and the upper edge of said wall, outlet means in said plate providing outlets from said chamber, means mounting a plurality of filters in said chamber on said plate, a portion of said filters being located adjacent said outlet means so that substantially all liquid passing from said inlet to said outlet passes through said filters, and wall means cooperating with said annular wall and said plate to form an outlet chamber below said plate with said outlet means providing communication between said outlet chamber and said filter chamber.

2. A filter in accordance with claim 1 including guide rods having one end secured to said plate, said shell surrounding said guide rods, the ends of said rods remote from said plate being curved inwardly toward said filters, a guide ring on the inner peripheral surface of said shell, said curved ends of said rods cooperating with said guide ring to orientate said shell with respect to said plate.

References Cited in the file of this patent

UNITED STATES PATENTS

| 2,212,647 | Nugent | Aug. 27, 1940 |
| 2,468,603 | Pew | Apr. 26, 1949 |
| 2,559,267 | Winslow et al. | July 3, 1951 |
| 2,742,157 | Brunton | Apr. 17, 1956 |
| 2,848,112 | Hass | Aug. 19, 1958 |
| 2,889,933 | Brundage | June 9, 1959 |
| 2,904,184 | Daley et al. | Sept. 15, 1959 |
| 2,909,285 | Besler | Oct. 20, 1959 |
| 2,925,913 | Wheeler | Feb. 23, 1960 |

FOREIGN PATENTS

| 759,438 | Great Britain | Oct. 17, 1956 |